(12) United States Patent
Kovermann et al.

(10) Patent No.: US 11,016,194 B2
(45) Date of Patent: May 25, 2021

(54) DYNAMIC TRACKING SYSTEM AND AUTOMATIC GUIDANCE METHOD BASED ON 3D TIME-OF-FLIGHT CAMERAS

(71) Applicant: Terabee S.A.S., Saint-Genis-Pouilly (FR)

(72) Inventors: Jan Kovermann, Valleiry (FR); Massimiliano Ruffo, Chêne-Bougeries (CH)

(73) Assignee: Terabee SAS, Saint-Genis-Pouilly (FR)

( * ) Notice: Subject to any disclaimer, the term of this patent is extended or adjusted under 35 U.S.C. 154(b) by 674 days.

(21) Appl. No.: 15/317,493

(22) PCT Filed: Jun. 12, 2015

(86) PCT No.: PCT/EP2015/063238
§ 371 (c)(1),
(2) Date: Dec. 9, 2016

(87) PCT Pub. No.: WO2015/189418
PCT Pub. Date: Dec. 17, 2015

(65) Prior Publication Data
US 2017/0146659 A1 May 25, 2017

(30) Foreign Application Priority Data
Jun. 12, 2014 (FR) .................................. 14/01338

(51) Int. Cl.
*G01S 17/10* (2020.01)
*G01S 17/66* (2006.01)
(Continued)

(52) U.S. Cl.
CPC ............ *G01S 17/10* (2013.01); *G01S 7/4865* (2013.01); *G01S 17/32* (2013.01); *G01S 17/42* (2013.01);
(Continued)

(58) Field of Classification Search
USPC ............................................... 356/3.01–5.15
See application file for complete search history.

(56) References Cited

U.S. PATENT DOCUMENTS 5,274,379 A * 12/1993 Carbonneau ....... H04B 10/2587
342/20
5,552,883 A 9/1996 Busch-Vishniac et al.
(Continued)

OTHER PUBLICATIONS

International Search Report of the parent case PCT/EP2015/063238 dated Dec. 15, 2015.
(Continued)

*Primary Examiner* — Yuqing Xiao
*Assistant Examiner* — Amir J Askarian
(74) *Attorney, Agent, or Firm* — Andre Roland S.A.; Nikolaus Schibli

(57) ABSTRACT

A dynamic tracking system comprises a three-dimensional camera based on time-of-flight technology, which comprises a receiver sensitive to the light emissions comprised in a certain range of wavelengths, a first emitter of light signals, a micro-computer interfacing and computing three-dimensional information coming from the receiver and controlling the emitter, and an internal or external secondary computer incorporating data analysis, database services, controls and external interfacing to vehicle and local or global data communication services.

21 Claims, 6 Drawing Sheets

(51) Int. Cl.
   *G01S 17/93*   (2020.01)
   *G01S 17/74*   (2006.01)
   *G01S 17/32*   (2020.01)
   *G05D 1/02*    (2020.01)
   *G01S 17/894*  (2020.01)
   *G01S 7/4865*  (2020.01)
   *G01S 17/42*   (2006.01)

(52) U.S. Cl.
   CPC .............. *G01S 17/66* (2013.01); *G01S 17/74* (2013.01); *G01S 17/894* (2020.01); *G01S 17/93* (2013.01); *G05D 1/0236* (2013.01)

(56) References Cited

U.S. PATENT DOCUMENTS

| | | | | |
|---|---|---|---|---|
| 5,966,226 | A * | 10/1999 | Gerber | F41G 3/2655 342/45 |
| 6,266,142 | B1 | 7/2001 | Junkins et al. | |
| 8,102,426 | B2 * | 1/2012 | Yahav | G01S 7/4863 348/207.99 |
| 8,643,850 | B1 | 2/2014 | Hartman et al. | |
| 9,091,754 | B2 * | 7/2015 | d'Aligny | G01S 17/10 |
| 2004/0233097 | A1 * | 11/2004 | McKendree | F41G 7/346 342/62 |
| 2008/0015771 | A1 * | 1/2008 | Breed | B60N 2/2863 701/300 |
| 2009/0010644 | A1 * | 1/2009 | Varshneya | G01S 7/481 398/33 |
| 2009/0190007 | A1 * | 7/2009 | Oggier | G01S 17/89 348/241 |
| 2012/0124113 | A1 | 5/2012 | Zalik et al. | |
| 2013/0070239 | A1 * | 3/2013 | Crawford | G01S 17/66 356/139.04 |
| 2015/0168554 | A1 * | 6/2015 | Aharoni | G01S 17/74 342/27 |

OTHER PUBLICATIONS

Written Opinion of the International Search Authority of the parent case PCT/EP2015/063238 dated Dec. 15, 2015.

* cited by examiner

DYNAMIC TRACKING SYSTEM AND AUTOMATIC GUIDANCE METHOD BASED ON 3D TIME-OF-FLIGHT CAMERAS

CROSS REFERENCE TO RELATED APPLICATIONS

The present application is a U.S. national stage application of PCT/EP2015/063238 filed on Jun. 12, 2015 designating the United States, and claims foreign priority to French patent application FR 14/01338 filed on Jun. 12, 2014, the contents of both documents being herewith incorporated by reference in their entirety.

FIELD OF INVENTION

The invention concerns a dynamic tracking system and an automatic guidance method for an autonomous vehicle moving in the air, such as a drone, or on the ground, such as vehicle, or on water, such as a boat.

BACKGROUND OF THE INVENTION

During routine surveillance tasks, for example, it can be useful to involve autonomous apparatuses, capable of steering themselves in an appropriate manner by using reference points placed on their path. Apparatuses such as drones, robots, or vehicles can be advantageously equipped with an automatic tracking system. These apparatuses are often subject to constraints with regard to weight and overall dimensions. The on-board devices must therefore meet these requirements and remain within acceptable ranges of volume and weight. Furthermore, the apparatuses in motion must be capable of tracking and identifying quickly the obstacles or the reference points necessary for their progression. In fact, devices which are too demanding in terms of analysis resources can not be adapted to the velocity of these apparatuses owing to their response time which is too long.

SUMMARY OF THE INVENTION

One aim of the invention is to provide a device-beacon— that is uniquely identifiable by a Time-Of-Flight camera.

One further aim of the present invention is to provide a tracking and guidance system or device which is light, rapid, autonomous and adaptable to any apparatus in motion, whether in the air, on land or on water. For example, the system can be associated or combined or integrated with a mobile telephone or any other mobile communication apparatus, including tablets, smartphones, positioning systems such as GPS and similar.

According to the invention, this aim is achieved by means of an active tracking and guidance system or device [FIGS. 1,(1) and (3)], permitting an object in motion [FIG. 1,(4)] to be situated in space, and permitting its course to be oriented in a controlled and automatic manner.

Specifically, the invention has as its object a dynamic tracking system that comprises a three-dimensional camera based on time-of-flight technology, which comprises a receiver sensitive to the light emissions comprised in a certain range of wavelengths, a first emitter of light signals; a micro-computer interfacing and computing three-dimensional information coming from the receiver and controlling the emitter and an internal or external secondary computer incorporating data analysis, database services, controls and external interfacing to vehicle and local or global data communication services. The system further comprises a beacon sensitive to the light signals originating from the first light emitter of the three-dimensional camera, this beacon being itself equipped with a second emitter of light signals of a wavelength compatible with the sensitivity of the three-dimensional camera. The beacon comprises a means for modulating the light signals originating from the first emitter of light signals. The three-dimensional camera is configured for measuring the return time of the signal reemitted by the beacon. The modulation is configured such to allow, by means of the three-dimensional camera and at least two measured frames, a unique identification and simultaneously a position determination of the beacon in a three-dimensional volume covered by the three-dimensional camera's field of view. The unique identification of the beacon being accomplished in the micro-computer by the analysis of the apparent distance of the beacon in consecutive frames of the three-dimensional camera.

More particularly, the system includes two or more entities, in communication with one another. The first entity is a three-dimensional camera [FIG. 1, (2)] containing an emitter of light signals [FIG. 1, (2c)] and the second entity functions in the manner of a beacon [FIG. 1, (1)], fixed or mobile, capable of recognizing the light signals emitted by the three-dimensional camera [FIG. 1, (2)], and of retransmitting this light signal in an active manner towards the three-dimensional camera [FIG. 1, (2)], such that the three-dimensional camera [FIG. 1, (2)] can measure its distance which separates it from the beacon and can position it precisely in its field of view. The active reception, modulation and reemission of the light signal from the beacon [FIG. 1, (1)] towards the three-dimensional camera [FIG. 1, (2)] allows the three-dimensional camera [FIG. 1, (2)] to identify the beacon [FIG. 1, (1)] from all the other measurement points in its field of view. It is therefore indispensable that the beacon [FIG. 1, (1)] returns a light signal which is more intense than the simple, passive light reflection of the signal emitted by the three-dimensional camera [FIG. 1, (2)]. The three-dimensional camera [FIG. 1, (2)] is preferably fixed on the apparatus in motion [FIG. 1, (4)] forming the subject of the automatic guidance, or is incorporated therein. The beacon [FIG. 1, (1)], in communication with the camera, can be single or can form part of a set of several beacons [FIG. 3, (1)] disposed over the path of the apparatus in motion. The beacons [FIG. 3, (1)] can be fixed and disposed in advance over a pre-established path. They can also be dispersed in a random manner, or they can be in motion, according to the particular applications for which the apparatus in motion is intended.

According to the present invention, the beacon [FIG. 1, (1)] is capable of modulating the signal emitted by the three-dimensional camera [FIG. 1, (2)] before transmitting, allowing the three-dimensional camera [FIG. 1, (2)] to identify precisely the nature of the beacon [FIG. 1, (1)]. In the case in which there are several beacons [FIG. 3, (1)] in the field of view of the apparatus, each of the beacons [FIG. 3, (1)] modulates the light signal in a unique and characteristic manner. The three-dimensional camera [FIG. 3, (2)] is then capable of identifying and locating precisely in three-dimensional space each of the beacons [FIG. 3, (1)] in its field of view.

In a preferred embodiment, the light signals are emitted in the near infrared.

In a further preferred embodiment the light signal from the first emitter is a characteristic pulsed sequence.

In a further preferred embodiment, the beacon further includes an analysis system of the signal emitted from the first emitter and a database permitting the storage of the characteristics of the signal emitted by the first emitter.

In a further preferred embodiment the modulation of the signal reemitted by the beacon includes a determined delay before reemission of the light signal towards the three-dimensional camera.

In a further preferred embodiment the modulation of the signal reemitted by the beacon includes a pre-established sequence of several successive delays, changing at each new start of a frame acquisition of the three-dimensional camera.

In a further preferred embodiment, the modulation of the signal reemitted by the beacon includes a change of wavelengths.

In a further preferred embodiment the three-dimensional camera further is arranged to be connected to a database, permitting the modulation of the signal reemitted by the beacons to be recognized.

In a further preferred embodiment, the three-dimensional camera contains in addition a communication means capable of communicating one or more instructions to one or more beacons.

The use of this guidance system [FIG. 1, (3)] is also the subject of the present invention. Examples of use can be the surveillance of zones necessitating a particular and routine vigilance. The surveillance can be overhead, due, for example, to the use of one or several drones. The surveillance can also be terrestrial. Zones such as railway lines, road networks, or urban areas can be advantageously monitored by autonomous apparatuses, such as drones, equipped with the guidance system of the present invention. Closed spaces can also be equipped with the device which is the subject of the present invention, such as hospitals, factories, or production areas, including machines in motion. In this latter application, the movements of the machines equipped with beacons [FIG. 1, (1)] are detected and analysed by means of the three-dimensional camera [FIG. 1, (2)]. Another application is the tracking of stocks of goods, where the elements which are to be tracked are equipped with beacons [FIG. 3, (1)] containing the information able to be specific to each of the elements, and in which the guidance and tracking system [FIG. 3, (3)] allows to track their movements, their location, the duration of their storage, and any other information to be followed which is necessary for the management of the stocks of goods. The device which is the subject of the present invention can also be used for urban measurements, such as the distance between buildings, measurements of the dimensioning and occupied space of infrastructures, or the surveillance of the structural integrity of buildings as they age, which includes measurements of subsidence, drift, inclination, deformation of the constructions. Another example of use can be the reconnaissance and the positioning of vehicles in motion around a given vehicle. A permanent vigilance of the environment therefore allows accidental collisions to be avoided.

In a variant, the device which is the subject of the present invention can also be applied to the automatic guidance of two or more vehicles [FIG. 4, (5a,b)], such that they follow one another. In this case, a beacon [FIG. 4, (1)] installed or integrated at the rear of one vehicle [FIG. 4, (5b)] is able to communicate with a tracking and guidance system [FIG. 4, (3)] installed or integrated at the front of another vehicle [FIG. 4, (5a)], such that the second vehicle is able to follow and keep the distance to follows the first by using the distance and heading information [FIG. 4, (6)] provided by the invention. The present invention can also be installed, for automatic cartography or referencing purposes, on vehicles driven by a human. Another example of use of the device of the present invention is the automatic detection of movements of a person [FIG. 5]. It is possible to equip a person in motion with one or several beacons [FIG. 5, (1)], positioned in a suitable manner at different locations on his body, and to measure the signals of these beacons [FIG. 5, (1)] re-emitted towards a three-dimensional camera [FIG. 5, (2)], positioned on a support external to the person in motion. This method can be advantageously used for the creation of animation, for the scientific analysis of sports movements, for the purposes of correction or motor re-education, or for any other activity necessitating a detection and/or differentiated analysis of movements.

In a further aspect, the invention provides a system for tagging an object which can be of public interest, whereby a person or a machine with interest in the object is equipped with a three-dimensional camera connected to a means of computing, the system further comprising a beacon arranged to identify itself with a code unique in an environment of interest, thereby enabling the person or the machine with interest in the object to identify the object and to receive meta information about the object In fact, the tracking and guidance system [FIG. 1, (3)] of the present invention includes a tracking means or method [FIG. 1, (2)] for a three-dimensional camera [FIG. 1, (2)].

However, these applications are only non-restrictive examples, and any application based on the system of the present invention is also the subject of the invention.

According to another aspect, the invention also provides an automatic guidance method of an apparatus in motion that includes the following steps:

a) an emission of a signal towards a beacon by a three-dimensional camera based on time-of-flight technology, the three-dimensional camera being comprised in a guidance and tracking system;

b) a reception of the signal by the beacon and the reemission of a non-modulated signal or of a modulated signal towards the three-dimensional camera and c) a reception and analysis by the three-dimensional camera of the signals reemitted by the beacon.

In a further preferred embodiment the signal emitted towards the beacon is a pulsed light sequence.

In a further preferred embodiment, the modulation of the signal includes the application of one or more predetermined delays.

In a further preferred embodiment, the modulation contains the characteristics of the beacon.

In a further preferred embodiment, the modulation contains information intended to activate or deactivate a function of the apparatus in motion.

In a further preferred embodiment, the method further includes in addition the emission of instructions by the guidance and tracking system, intended for the beacon.

BRIEF DESCRIPTION OF THE FIGURES

Other characteristics and advantages of the invention will now be described in detail in the following description which is given with reference to the attached figures, which represent diagrammatically.

DETAILED DESCRIPTION OF THE INVENTION

Figure 1:
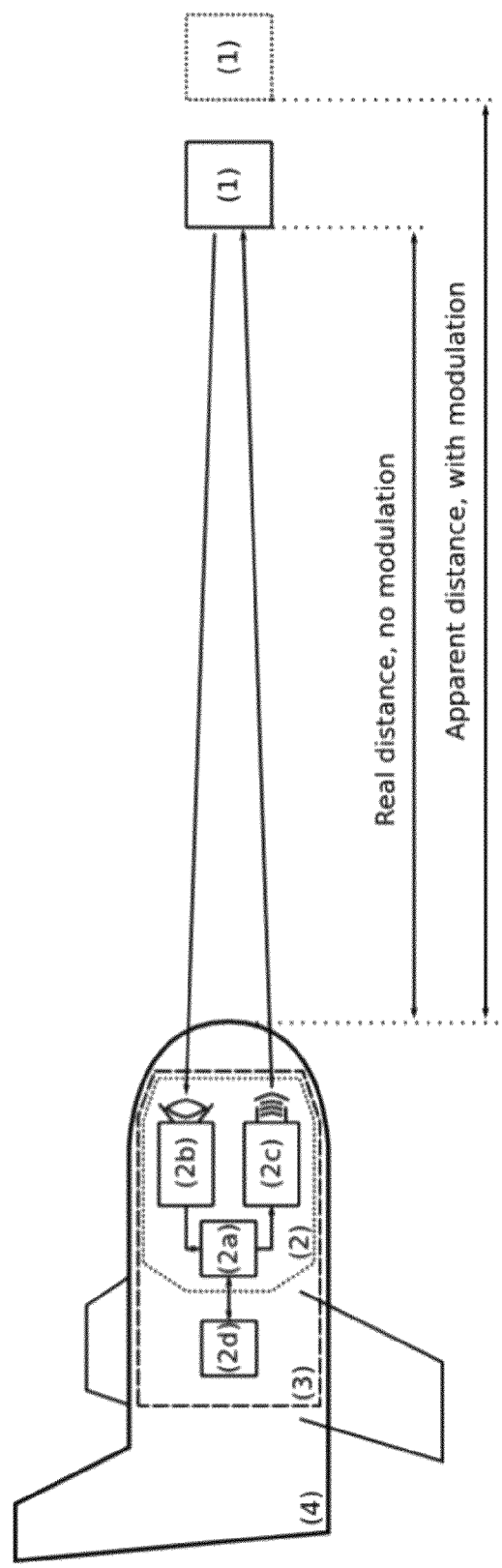
FIG. 1: an example apparatus in motion [FIG. 1, (4)] equipped with a three-dimensional camera [FIG. 1, (2)] in connection with a micro-computer [FIG. 1, (2d)] for frame sequence analysis and for providing a database or a connection to a database, in communication with a beacon [FIG. 1, (1)], reemitting an immediate or a delayed respectively modulated signal.

The tracking and guidance system [FIG. 1, (3)] of the present invention is based on a three-dimensional camera [FIG. 1, (2)], equipped with an emitter of light signals [FIG. 1, (2c)], and at least one beacon [FIG. 1, (1)] capable of identifying the light signals of the three-dimensional camera [FIG. 1, (2)] and of emitting towards the three-dimensional camera [FIG. 1, (2)] the same light signal(s), or different signals.

The light signal(s) reemitted by the beacon [FIG. 1, (1)] towards the three-dimensional camera [FIG. 1, (2)] are adapted to the characteristics of the three-dimensional camera [FIG. 1, (2)], such that they can be detected, analysed and recognized by it. The light source of the three-dimensional camera [FIG. 1, (2)] can emit light which is visible or invisible to the human eye. In this case, a wavelength greater than 780 nm is invisible to the human eye and represents the advantage of not being contaminated by light sources of the environment and in addition does not disturb humans or any other imaging system working in the visible wavelength range. In fact, the light emitted by the emitter [FIG. 1, (2c)] of the three-dimensional camera [FIG. 1, (2)] is advantageously in the infrared range, but, so as to demarcate itself from any thermal emissions, the emitter [FIG. 1, (2c)] preferably emits in the near infrared. The light is therefore preferably emitted in the spectrum comprised between 750 nm and 1000 nm, and more advantageously between 800 and 900 nm. However, the three-dimensional camera [FIG. 1, (2)] remains functional over wider ranges of wavelengths, being able to extend for example up to 2000 nm, or more. The three-dimensional camera [FIG. 1, (2)] could be modified without losing its main function in such a way that it emits a pulsed light according to a characteristic and possibly repetitive sequence, serving as a code, or as an identification key. The beacon [FIG. 1, (1)] is therefore equipped with a database [FIG. 2, (1e)] containing the identification key or the code emitted by the in such way modified three-dimensional camera [FIG. 1, (2)]. It is thus capable of identifying the three-dimensional camera [FIG. 1, (2)].

The emitter [FIG. 1, (2c)] and receiver [FIG. 1, (2b)] of light signals are together with a control and processing computer [FIG. 1, (2a)] an integral part of a three-dimensional camera based on the time-of-flight principle and are available as a commercial product.

The beacon [FIG. 1, (1)] emits in return a light detectable by the three-dimensional camera [FIG. 1, (2)]. The beacon [FIG. 1, (1)] preferably emits in the same spectrum as the light emitted by the three-dimensional camera [FIG. 1, (2)]. The beacon [FIG. 1, (1)] ideally emits according to the same wavelength(s) as the three-dimensional camera [FIG. 1, (2)]. The pulsed sequence of the light received by the beacon [FIG. 1, (1)] is in general retained on its return towards the three-dimensional camera [FIG. 1, (2)]. The sequence of the reemitted light is modified, i.e., modulated. The three-dimensional camera [FIG. 1, (2)], equipped with a means for calculation of delay between the light emitted and the light received [FIG. 1, (2a)], is capable of measuring the distance which separates it from the beacon [FIG. 1, (1)]. Typically in air at ambient conditions, a delay in the order of 1 nanosecond corresponds to a course of approximately thirty centimetres. In this case, the distance separating the three-dimensional camera [FIG. 1, (2)] from the beacon [FIG. 1, (1)] is measured at approximately fifteen centimetres, namely half of the total path of the light from its emission to its reception by the three-dimensional camera [FIG. 1, (2)]. Various means for calculation of the distance can be implemented. In a particular mode for distance calculation, the three-dimensional camera [FIG. 1, (2)] sends a light pulsation and measures the delay after which it receives the signal reemitted by the passively reflecting objects in its field of view, including the actively reflected signal of one or multiple beacons [FIG. 1, (1) and FIG. 3, (1)]. The delay is directly correlated to the distance which separates the three-dimensional camera [FIG. 1, (2)] from the objects in its field of view and therefore also the beacon [FIG. 1, (1)], as described above. In another mode of operation, the three-dimensional camera [FIG. 1, (2)] emits a continuous signal with an amplitude or phase modulation, and measures the phase difference of the modulation of the signal received in return from the objects in its field of view and therefore also the beacon [FIG. 1, (1)]. Another distance measurement mode consists in the emission of a series of signals of a specific mathematical type or code by the three-dimensional camera [FIG. 1, (2)] and their time-shifted auto-correlation with the series of corresponding signals reemitted by the objects in its field of view and therefore also the beacon [FIG. 1, (1)]. The delay in reception respectively the time-shift applied before the autocorrelation of this series of signals is directly proportional to the distance which separates the beacon [FIG. 1, (1)] from the three-dimensional camera [FIG. 1, (2)].

Figure 3:
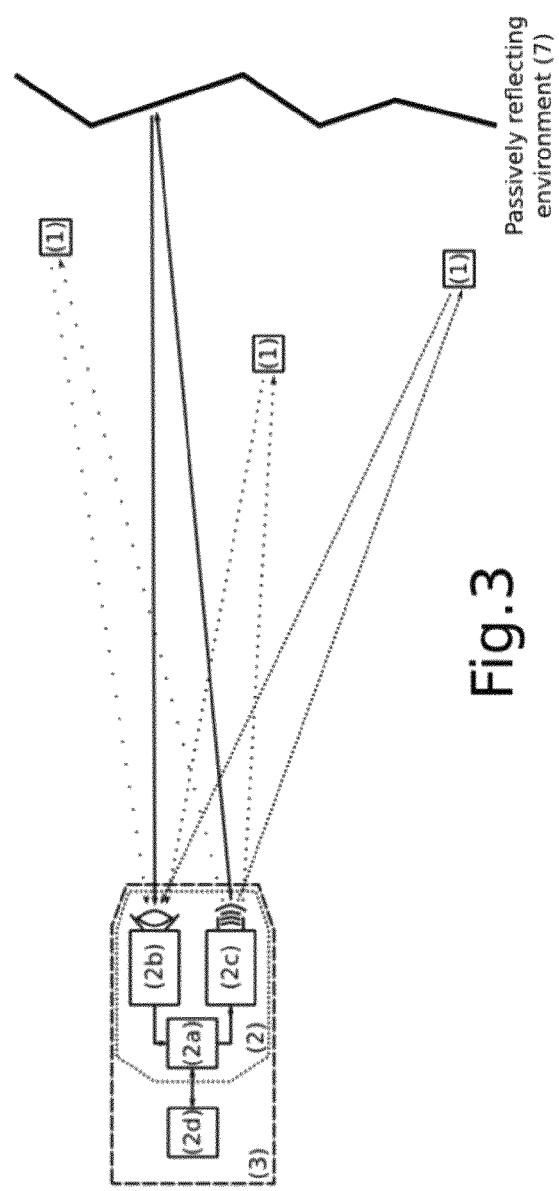
FIG. 3: a tracking and guidance system [FIGS. 3, (3) and (1)] comprising a three-dimensional camera [FIG. 3, (2)] connected to a computer [FIG. 3, (2d)] for frame sequence analysis and database access, in addition multiple beacons [FIG. 3, (1)] and a passively reflecting background or environment in the field of view of the three-dimensional camera [FIG. 3, (2)]

In general, in a three-dimensional camera [FIG. 1, (2)], the distance is also determined with respect to a non-active object [FIG. 3, (7)], i.e. different from a beacon [FIG. 3, (1)], which is actively reemitting a light signal. It is the case in particular in the passive reflection of the signal of the three-dimensional camera [FIG. 1, (2)] on a reflecting surface. The methods for determining distance described above can then be used.

A pixel of the three-dimensional camera [FIG. 1, (2)] is sufficient for identifying a beacon [FIG. 1, (1)], which represents the advantage of only necessitating very few calculation resources and of preserving a very good reactivity by limiting the consumption of resources and the processing times of the signals. In consecutive measurement frames of the three-dimensional camera [FIG. 1, (2)] and the beacon [FIG. 1, (1)] in the field of view and in range of the three-dimensional camera [FIG. 1, (2)], at least one pixel representing the beacon [FIG. 1, (1)] will appear at different distances each new frame taken by the three-dimensional camera [FIG. 1, (2)]. The sequence of changing distances can contain a coded, unique identification of the beacon [FIG. 1, (1)] or other data provided by the beacon [FIG. 1, (1)] and is extracted and analysed by the computer [FIG. 1, (2d)] of the tracking and guidance system [FIG. 1, (3)].

In a variant, the three-dimensional camera [FIG. 1, (2)] can be equipped with a screen. Several beacons [FIG. 3, (1)] can be located simultaneously. In this case, they each activate a different pixel in the consecutive measurement frames taken by the three-dimensional camera [FIG. 1, (2)] and take the form of a set of points after extraction and analysis by the computer [FIG. 1, (2d)] of the tracking and guidance system [FIG. 1, (3)].

Figure 2:
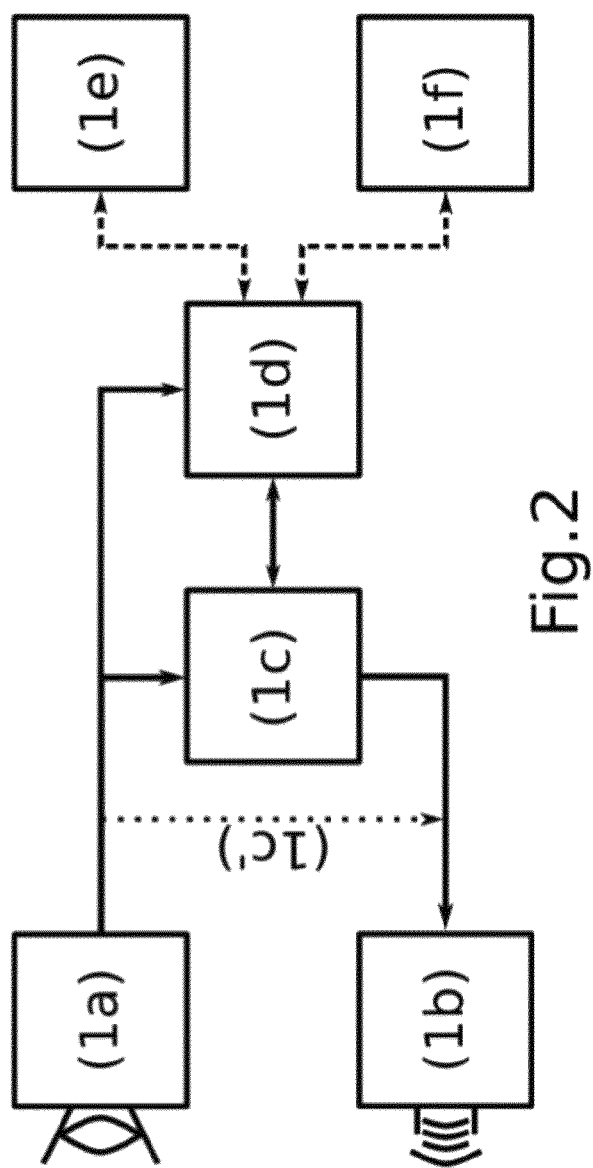
FIG. 2: a block diagram representation of the beacon [FIG. 1, (1)], comprising a receiver [FIG. 2, (1a)] adapted to the light emissions of a three-dimensional camera [FIG. 1, (2)], converting this light signal into an electronic signal, a light emitter [FIG. 2, (1b)] preferably adapted to the sensitive wavelength range of the three-dimensional camera [FIG. 1, (2)] and converting an electronic signal into a corresponding light signal, a means of either forwarding the electronic signal from the receiver [FIG. 2, (1a)] to the emitter [FIG. 2, (1b)] without modulation [FIG. 2, (1c')] and with modulation [FIG. 2, (1c)], in addition a computer [FIG. 2, (1d)] capable of controlling the modulation unit [FIG. 2, (1c) or (1c')] and capable of analysing the signal received by the receiver [FIG. 2, (1a)]. The beacon [FIG. 2, (1a,b,c,d)] can comprise an internal or external database [FIG. 2, (1e)], storing information about the identity of the beacon [FIG. 2, (1a,b,c,d)] or any other static or dynamic information of interest to be transmitted to or to be compared to information received from the three-dimensional camera [FIG. 1, (2)], and one or multiple internal or external sensors or actors [FIG. 2, (1f)] whose measurements or actions are of interest to be transferred to the tracking and guidance system [FIG. 1, (3)] or can act on command received by the tracking and guidance system [FIG. 1, (3)]

According to a particular aspect of implementation, the emission means of the three-dimensional camera [FIG. 1, (2c)] and of the beacon [FIG. 2, (1b)] are light-emitting diodes, or LEDs, emitting in the near infrared, with the wavelengths specified above. Alternatively, diodes of the LASER or VCSEL type can also be used. Depending on the specific needs, emission means of the three-dimensional camera [FIG. 1, (2)] can emit in ranges of wavelengths including the near infrared and extending beyond the near infrared, such as for example the range from 750 to 2000 nm. Depending on specific needs, the emission means of the three-dimensional camera [FIG. 1, (2)] can emit in other ranges of wavelengths, including or excluding the near infrared. In particular, the emission can be in the visible range and is not limited to a narrow band emission, but can also cover parts or even the full visible spectrum and even exceed it, e.g. a vehicle headlight which is modulated and serves in addition to its primary purpose as illumination for the three-dimensional camera [FIG. 1, (2)], providing a three-dimensional representation provided by the tracking and guidance system [FIG. 1, (3)] of the illuminated area without the need of a separate light source for the three-dimensional camera [FIG. 1, (2)].

The reception means of the signals reemitted by the beacon [FIG. 1, (1)], placed on the three-dimensional camera [FIG. 1, (2)], is ideally a photonic sensor of the CMOS or CCD type, or a photodiode of any kind or a phototransistor. A combination of several sensors is also possible. Other active sensors in the wavelength ranges used can similarly be used. The receiver placed on the beacon [FIG. 2, (1a)] is preferably of the photodiode, photomultiplier or avalanche diode type. However, any receiver capable of converting a light signal into an electrical signal can be used in a similar manner in the device which is the subject of the invention. Several receivers can also be integrated in the beacon [FIG. 2], being able to function in a simultaneous or alternating manner, as a function of the applications of the system. The receivers [FIG. 2, (1a)] used in this case can then be selective of a given range of wavelengths, or of a specific wavelength.

In a particular embodiment, the beacon [FIG. 2] reemits the light signal, received by the three-dimensional camera [FIG. 1, (2)], without delay or modulation [FIG. 1, no modulation], or reemits the signal after modulation [FIG. 1, with modulation]. The modulated and non-modulated signals are reemitted with an intensity greater than the simple natural reflection from the surface of the housing of the beacon [FIG. 2]. The reemission of the modulated signal can be concomitant with or successive to the non-modulated signal. The modulated and non-modulated signals can also form the subject of a given sequence and repeated once or several times. The repetition of the sequences are in this case compatible with the measurement frame rate of the three-dimensional camera [FIG. 1, (2)], that is how often the three-dimensional camera [FIG. 1, (2)] provides a full new set of data points per second.

In a preferred operating mode, the measurement time of the three-dimensional camera [FIG. 1, (2)] is significantly faster than the measured movement, such that a sequence of two or more consecutive measurements or frames can be established before the measured distances of the objects in the field of view of the three-dimensional camera [FIG. 1, (2)] have varied significantly.

Thus, the beacon [FIG. 1, (1)] is equipped with the means for modulating the signal [FIG. 2, (1c,d)] before reemitting it. To do so, the beacon [FIG. 1, (1)] is equipped with a receiver [FIG. 2, (1a)] appropriate to the wavelength and time-structure of the emission from the three-dimensional camera [FIG. 1, (2)], converting the received signal into an electronic signal. This electronic signal is then modulated by the means of an electronic modulator [FIG. 2, (1c)] which is controlled by an embedded computer [FIG. 2, (1d)]. This embedded computer [FIG. 2, (1d)] can also be used for analysing the electronic signal to be able to react appropriately to the sequence emitted by the three-dimensional camera [FIG. 1, (2)] and it can have access to a data base [FIG. 2, (1e)] storing information about the beacon [FIG. 2] or to an external sensing device attached to the beacon [FIG. 2, (1e)]. After modulation, the electronic signal is converted back and emitted in the wavelength range of the receiving three-dimensional camera [FIG. 1, (2)] by the means of an optical emitter [FIG. 2, (1b)]. This emission can comply to, but is not limited to the sensitive wavelength and time-structure of the light expected by the three-dimensional camera [FIG. 1, (2)].

The modulation of the signal can consist for example in the application of a series of pre-defined delays of the order of several nanoseconds stored in a database [FIG. 2, (1e)] inside or connected to the beacon before the reemission of the signal. The reemission delays can be compared by the computer [FIG. 1, (2d)] of the tracking and guidance system [FIG. 1, (3)] connected to the three-dimensional camera [FIG. 1, (2)] with values stored in a database [FIG. 1, (le)], integrated in or connected to the tracking and guidance system [FIG. 1, (3)]. In this way, the tracking and guidance system [FIG. 1, (3)] is capable of identifying the beacon [FIG. 1, (1)]. In a preferred mode of operation, the three-dimensional camera [FIG. 1, (2)] carries out at least two successive measurements of the signal reemitted by the beacon [FIG. 1, (1)]. The combination of a reemission without delay and a reemission with delay allows the three-dimensional camera [FIG. 1 (2)] to measure the changing apparent distance which separates it from the beacon [FIG. 1, (1)], whilst identifying the beacon [FIG. 1, (1) using the computer [FIG. 1, (2d)] of the tracking and guidance system [FIG. 1, (3)]. The database to which the tracking and guidance system [FIG. 1, (3)] is connected can be, for example, in the form of an electronic chip, but other means for online or offline data storage can be used, depending on the uses of the apparatus. The database can also be incorporated in the computer [FIG. 1, (2d)] of the tracking and guidance system [FIG. 1, (3)].

In a particular embodiment, the beacon [FIG. 1, (1)] is able to apply a variable delay before reemission of the light signal. The variation of the delay can be random or can follow a pre-established scheme which is controlled by an embedded computer [FIG. 2, (1d)] and stored in an internal or external database [FIG. 2, (1e)]. In the case of a pre-established variation of delays, the beacon [FIG. 1, (1)] can, for example, reemit the signal according to the following sequence:

reception of the signal→reemission without delay-→reemission with delay 1→reemission with delay 2→reemission with delay 3 . . . .

The sequence above can be carried out once or several times. It can also be repeated in a loop for a predetermined number of times. It can include a number of variable delays, preferably 2 to 50 different delays, sequenced according to a pre-established order. The sequence can also contain one or more delays repeated once or several times.

Figure 6:
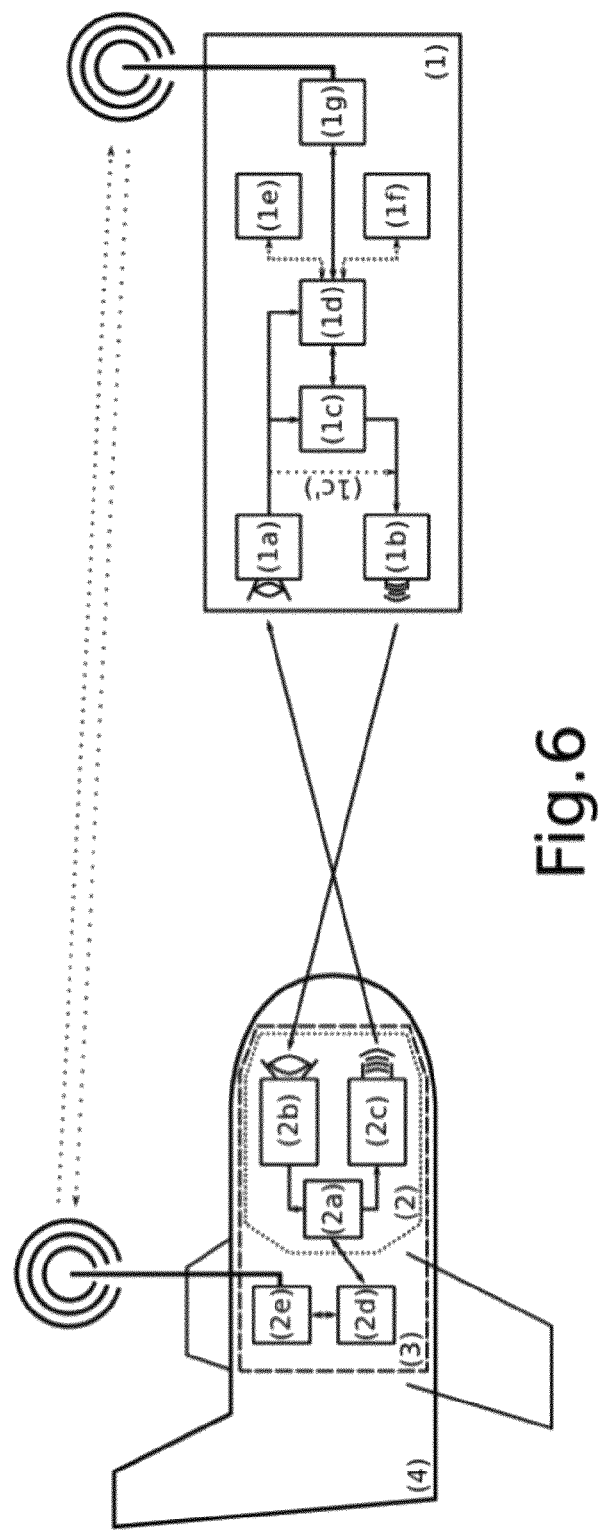
FIG. 6: a tracking and guidance system [FIG. 6, (3)] with means of communication with a beacon [FIG. 6, (1)] comprising the modulation of the time between consecutive frame measurements of the three-dimensional camera [FIG. 6, (2)] to be able to transmit information coded into this modulation towards the beacon [FIG. 6, (1)]. In another embodiment, the information transmission from the tracking and guidance system [FIG. 6, (3)] towards the beacon [FIG. 6, (1)] is implemented with the means of a transmitter or transceiver [FIG. 6, (2e)] connected to the tracking and guidance system computer [FIG. 6, (2d)], which can either work in the radio frequency spectrum or light spectrum or using any other means of suitable data transmission technologies. The receiver or transceiver on the beacon [FIG. 6, (1g)] is adapted to the emission of tracking and guidance system transmitter or transceiver [FIG. 6, (2e)] and can receive uni-directional information from the tracking and guidance system [FIG. 6, (3)] or communicate bi-directional with it.

The sequence "Delay 1→Delay 2→Delay 3→Delay n . . . ", where n is the number of delays used, represents a code which is recognizable by the computer [FIG. 1, (2d)] of the tracking and guidance system [FIG. 1, (3)], connected to the three-dimensional camera [FIG. 1, (2)], due to its data base. This pre-established code allows the beacon [FIG. 1, (1)] to send particular information to the tracking and guidance system [FIG. 1, (3)]. The information transmitted by the sequence of delays can be simply the characteristics of the beacon [FIG. 1, (1)] in communication with the tracking and guidance system [FIG. 1, (3)]. In this case, the reemitted signal serves as a signature or fingerprint of the beacon [FIG. 1, (1)] and allows to correct the apparent position into the real position due to the knowledge of the delays applied by the beacon [FIG. 1, (1)] and stored in the data base being part of the tracking and guidance system [FIG. 1, (3)]. The information can contain, in addition, a message of a different nature, such as a command, an instruction, a danger message, or any other information adapted to the use of the apparatus. The supplementary information items emitted by the beacon [FIG. 1, (1)] can result from independent measures carried out by the beacon [FIG. 1, (1)] or picked up by a sensor connected to the beacon [FIG. 2, (1f)]. They can also be transmitted previously to the beacon [FIG. 6, (1)] by a suitable communication means [FIGS. 6, (2e) and (1g)], including the wi-fi system, radiocommunication, infrared communication, or any other means of information transmission.

Three-dimensional cameras [FIG. 1, (2)] based on the time-of-flight principle, such as those commercially available, can be used. The three-dimensional camera [FIG. 1, (2)] used in the present invention is ideally capable of frame rates of at least several tens of frames per second, even if the concept could apply for slower frame rates in specific applications.

In a particular embodiment, the tracking and guidance system [FIG. 1, (3)] on-board in the apparatus in motion [FIG. 1, (4)] is equipped with a means of communication with the commands of the apparatus [FIG. 1, (4)]. It can thus act on the trajectory of the apparatus [FIG. 1, (4)] as a function of the information reemitted by the beacons [FIG. 1, 1]. In the case of a zone surveillance over a preestablished path, the information transmitted by the beacon [FIG. 1, (1)] can be, for example, to direct the apparatus towards the next beacon [FIG. 1, (1)], or alternatively towards another beacon [FIG. 1, (1) or FIG. 3, (1)] of the path. In the case of an anti-collision system, the information transmitted by the beacon [FIG. 1, (1)] can be, for example, to stop the apparatus [FIG. 1, (4)] when the distance with an identified beacon [FIG. 1, (1)] reaches a certain limit. It is clear that any command aiming to modify the trajectory of the apparatus [FIG. 1, (4)] can be transmitted changing to the modulation of the light signal. Commands aiming to activate or deactivate certain functions of the apparatus [FIG. 1, (4)] are also possible. It is possible, for example, to activate or deactivate a surveillance camera on approaching a particular beacon [FIG. 1, (1)]. Any other function of the apparatus [FIG. 1, (4)] can thus be administered according to the particular application of the apparatus [FIG. 1, (4)]. Non-exhaustively, it can be surveillance by camera, or a treatment above a cultivation area, or the activation of a cartography or topology system, the activation and/or stopping of a sound recording system, or a system for analysis of the air or of another constituent or property of the environment. The functions of the autonomous apparatus [FIG. 1, (4)] can be dedicated to security tasks, such as surveillance or dissuasion, but also to scientific tasks when the concern is with carrying out particular and/or routine measurements, reconnaissance or exploration tasks, sound, thermal or hyperspectral cartography tasks, or a task of the drone following and filming humans in action, including selfies—the fact that the drone may stay at a constant distance from the beacon on the humans and possibly also trigger the taking of a photo each time the subject is in the scene is one advantageous property. The apparatus can also be provided with a sound or visual, or radio warning system, or any other warning system, commanded by the beacons [FIG. 1, (1) and FIG. 3, (1)] according to the mode described above.

The autonomous apparatus [FIG. 1, (4)] equipped with the tracking and guidance system [FIG. 1, (3)] according to the invention can be used outdoors or in a closed environment, such as a hangar, an exhibition hall, a tunnel, or another other delimited environment.

In another particular embodiment, the sequence of delays applied by the beacon [FIG. 1, (1)] is random, such that the transmitted information is not comprehensible by the three-dimensional camera [FIG. 1, (2)]. The beacon [FIG. 1, (1)] is then used as a jamming or camouflage system, preferably with the emitter of the beacon [FIG. 1, (1)] emitting towards the receiver of the three-dimensional camera [FIG. 1, (2b)] at power levels superior to the power levels emitted by the passively reflecting objects in the field of view of the three-dimensional camera [FIG. 1, (2)].

The modulation of the light signal by the beacon [FIG. 1, (1)] can be the application of a delay or of a sequence of delays, as mentioned above. Alternatively, the modulation can consist in a change of the wavelengths of the reemitted signal with respect to the received signal. In a similar manner to the delays, the wavelengths received by the three-dimensional camera [FIG. 1, (2)] can be compared to a database and can permit the communication of information which is comprehensible by the tracking and guidance system [FIG. 1, (3)]. The variations in wavelengths can be single or sequential. Several variations in wavelengths can also be applied, preferably according to a pre-established scheme, either in a single manner or in a sequential manner. The change(s) in wavelength can be combined or not with the application of a delay or of a sequence of delays. When several beacons [FIG. 3, (1)] are active, each of the beacons [FIG. 3, (1)] can apply a modulation mode independent of the other beacons [FIG. 3, (1)]. It is therefore possible for tracking and guidance system [FIG. 1, (3)] to recognize a modulation of wavelength carried out by one beacon [FIG. 3, (1)] and a modulation by application of a specific delay carried out by another beacon [FIG. 3, (1)].

According to a preferred mode of operation, the three-dimensional camera [FIG. 1, (2)] remains insensitive to the signal which it emits, and only detects the signals reemitted by the beacon [FIG. 1, (1)] or beacons [FIG. 3, (1)] situated in its field of view, but not the details of its surroundings in the field of view reflecting only in a passive way without change in wavelength. The beacon [FIG. 1, (1)] therefore needs to emit in the wavelength range the three-dimensional camera [FIG. 1, (2)] is sensitive to. The detection, identification and locating of the beacons [FIG. 3, (1)] are therefore facilitated, and also the reception of any additional information reemitted by the beacons [FIG. 3, (1)].

In another particular embodiment, the tracking and guidance system [FIG. 1, (3)] which is the subject of the invention allows the three-dimensional camera [FIG. 1, (2)] to send information to a specific beacon [FIG. 3, (1)]. The tracking and guidance system [FIG. 6, (3)] is connected to a communication means [FIG. 6, (2e)], which can be the same or different from the emission means described above, and which allows the tracking and guidance system [FIG. 6, (3)] to send particular instructions to the beacon [FIG. 6, (1)]. In particular, the three-dimensional camera [FIG. 1, (2)] can be equipped with a light source emitting [FIG. 1, (2c)] in a different wavelength from the near infrared. Alternatively, it can be connected to an emission means of radiofrequencies [FIG. 6, (2e)], e.g., of the wi-fi type, or any other communication means permitting instructions to be sent to the beacon [FIG. 6, (1)]. In a particular mode of operation, the tracking and guidance system computer [FIG. 6, (2d)] can vary the delay between two measurements of the three-dimensional camera [FIG. 6, (2)] in a specific manner. In this way, the characteristic delay or time structure used by the tracking and guidance system [FIG. 6, (3)] on the emission of the light signal contains or represents a code recognized by the beacon [FIG. 6, (1)]. The code correlated to the specific delay or time structure used by the tracking and guidance system [FIG. 6, (3)] corresponds to an instruction transmitted to the beacon [FIG. 6, (1)]. In this particular mode, the instructions can be transmitted to the beacon [FIG. 6, (1)] concomitantly to its identification by the tracking and guidance system [FIG. 6, (3)]. The beacon [FIG. 6, (1)] is equipped with the suitable receiving means, whether this is a photovoltaic or photosensitive sensor [FIG. 6, (1a)], a radio receiver [FIG. 6, (1a)], or wi-fi receiver, or any other receiver or detector capable of receiving or analysing the signal emitted by the tracking and guidance system [FIG. 6, (3)]. This enables the tracking and guidance system [FIG. 6, (3)] to concomitantly position the beacon [FIG. 1, (1)] in the field of view of the three-dimensional camera [FIG. 6, (2)] and send instructions or data to it. Examples of instructions returned by the tracking and guidance system [FIG. 6, (3)] to the beacon [FIG. 6, (1)] can be an instruction for starting or stopping the beacon [FIG. 6, (1)]. The instruction can also be, depending on uses, to modify the modulation of the signal by the beacon [FIG. 6, (1)]. The signal emitted by the beacon [FIG. 6, (1)] therefore can becomes different after its communication with the tracking and guidance system [FIG. 6, (3)]. The beacon [FIG. 6, (1)] can in fact change signature, or change the instructions intended either for tracking and guidance system [FIG. 6, (3)], or for the tracking and guidance system [FIG. 6, (3)] during its following passage, or else change signature and instructions at the same time.

The present invention is, in fact, a system or means, or device, or method of tracking of beacons [FIG. 1, (1)] by the tracking and guidance system [FIG. 1, (3)], comprising a three-dimensional camera [FIG. 1, (2)] and a sequential frame analysis computer [FIG. 1, (2d)] extracting the encoded messages from the beacon [FIG. 1, (1)] from the data stream of the three-dimensional camera [FIG. 1, (2)]. It is also a system, or means or device, or method of guidance of an autonomous apparatus in motion [FIG. 1, (4)]. More particularly, the invention also concerns a tracking and/or guidance method which includes the following steps:

a) emission of a signal towards a beacon [FIG. 1, (1)] by the three-dimensional camera [FIG. 1, (2)] based on time-of-flight technology, the three-dimensional camera being comprised in a guidance and tracking system;

b) reception of the signal by the beacon [FIG. 1, (1)] and the reemission of a non-modulated signal [FIG. 1, (1c')] or of a modulated signal towards the three-dimensional camera [FIG. 1, (2)], and c) the reception and analysis by the three-dimensional camera [FIG. 1, (2)] of the signals reemitted by the beacon [FIG. 1, (1)], d) iteration of steps a) to c) at least once, e) analysis of the signals reemitted by confrontation with a database using the computer [FIG. 1, (3)] of the tracking and guidance system [FIG. 1, (3)], f) implementation of any instructions.

Step d) is necessary in the case where the beacon [FIG. 1, (1)] applies different delays on the modulation of the signal.

The present invention is also a system or means or device for communication between two or more geographically separated entities. In a preferred embodiment, at least one of the entities is in motion. In this communication system or means or device, the information transmitted by, or exchanged between, the entities is intended for the automatic guidance of the entity in motion, either directly or indirectly. More particularly, the communication protocol contains the following phases:

a) emission of a signal from the three-dimensional camera [FIG. 1, (2)] towards a beacon [FIG. 1, (1)], b) reception of the signal by the beacon [FIG. 1, (1)] and reemission of a non-modulated signal or of a modulated signal towards the three-dimensional camera [FIG. 1, (2)], c) reception by the three-dimensional camera [FIG. 1, (2)] of the signals reemitted by the beacon [FIG. 1, (1)], d) iteration of steps a) to c) at least once, e) analysis of the reemitted signals by confrontation with a database using the computer [FIG. 1, (3)] of the tracking and guidance system [FIG. 1, (3)], f) implementation of any instructions.

Step d) is necessary in the case where the beacon [FIG. 1, (1)] applies different delays on the modulation of the signal.

The communication means which is the subject of the present invention is constituted by a tracking and guidance system [FIG. 1, (3)], as described above, and by one or more beacons [FIG., (1) or FIG. 3, (1)], as described above. A supplementary step in the communication protocol can be the transmission of instructions from the tracking and guidance system [FIG. 1, (3)] towards the beacon [FIG. 1, (1)]. The communication of instructions from the tracking and guidance system [FIG. 1, (3)] towards the beacon [FIG. 1, (1)]] can be carried out before the identification of the beacon [FIG. 1, (1)], or afterwards. Instructions can also be transmitted concomitantly to the identification of the beacon [FIG. 1, (1)] by the tracking and guidance system [FIG. 1, (3)].

Another object of the present invention is the implementation of the guidance method, in which the signal emitted by the three-dimensional camera [FIG. 1, (2)] towards a beacon [FIG. 1, (1)] is a pulsed infrared sequence, ideally produced by a device such as an infrared diode (of the LED, VCSEL or LASER type). In the guidance method of the present invention, the signal is reemitted by the beacon [FIG. 1, (1)] according to the modalities described above. In this case, a preferred implementation of the guidance method includes an immediate reemission of the signal, combined with a reemission after a predetermined delay in the next measurement frame of the three-dimensional camera [FIG. 1, (2)]. The reemission of the signal is advantageously carried out according to a characteristic sequence being able to include several different delays, and serving as a signature or fingerprint of the beacon [FIG. 1, (1)], and being able, in addition, to contain information destined for the on-board tracking and guidance system [FIG. 1, (3)]. The method, as described here, permits, in return, the possible communication of instructions intended for the beacon [FIG. 1, (1)], according to the modalities described above.

Figure 4:
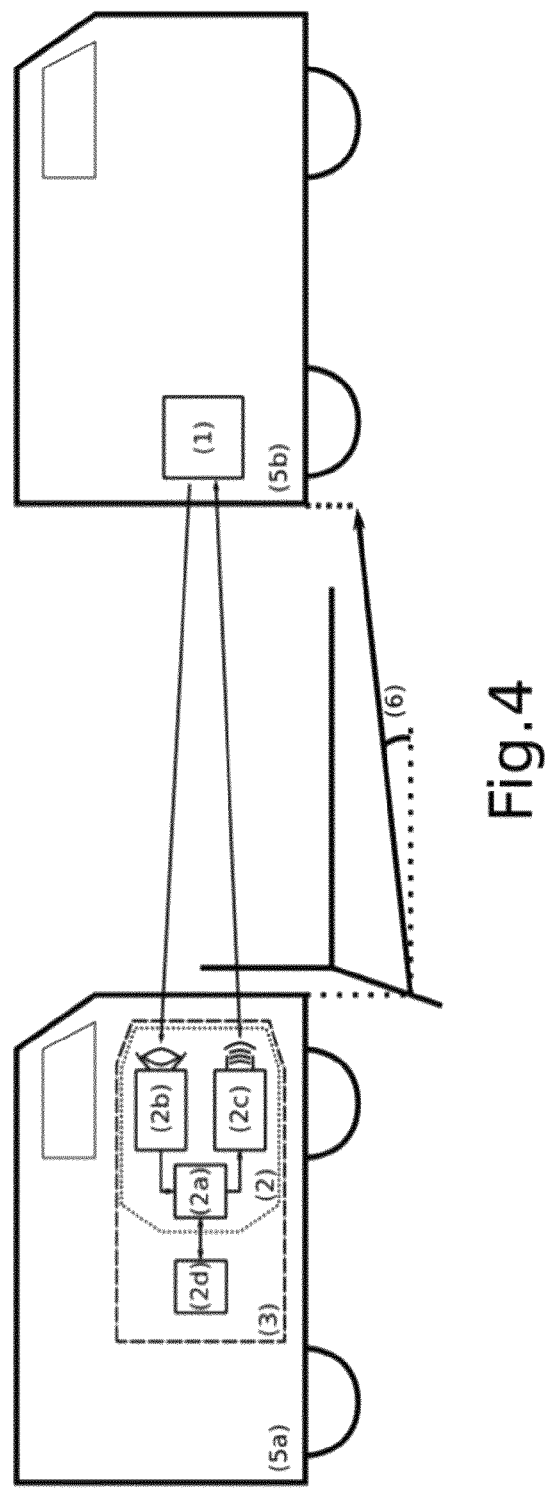
FIG. 4: a tracking and guidance system [FIGS. 4, (3) and (1)] comprising a three-dimensional camera [FIG. 4, (2a,b, c)] connected to a computer [FIG. 4, (2d)] for frame sequence analysis and database access installed on or integrated in a vehicle [FIG. 4, (5a)] and at least one beacon [FIG. 4, (1)] installed on or integrated in the rear of at least one or more vehicles [FIG. 4, (5b)], wherein the tracking and guidance system [FIG. 4, (3)] provides distance and heading data [FIG. 4, (6)] of the vehicle(s) in the field of view of the three-dimensional camera [FIG. 4, (2)], enabling either driver support or automatic road-train like following of the vehicles.
Figure 5:
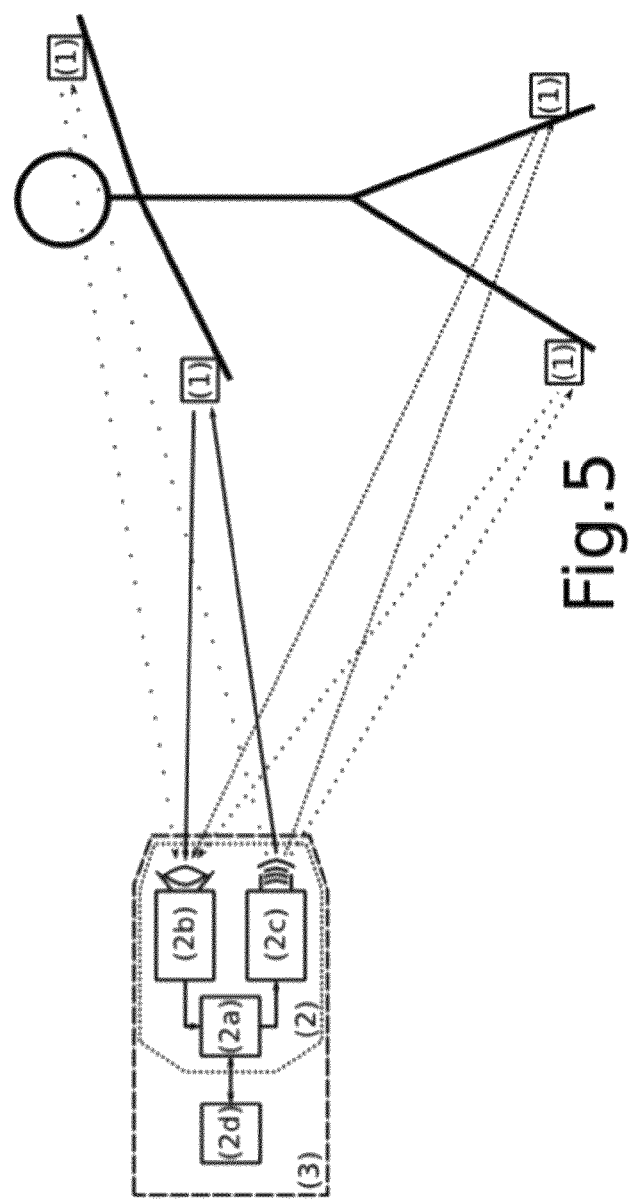
FIG. 5: a tracking and guidance system [FIG. 5, (3)] according to the invention, used for tracking movements of a human by attaching beacons [FIG. 5, (1)] to the parts of interest in motion and measuring heading and distance of each beacon [FIG. 5, (1)] using the tracking and guidance system [FIG. 5, (3)]

The present invention comprises the apparatus [FIG. 1, (4)] equipped with the system described above, or guided according to the method described here. The apparatus [FIG. 1, (4)] can be an autonomous vehicle moving in the air, such as a drone, or on the ground, such as a vehicle, or on water, such as a boat. The present invention also includes a production machine equipped with the detection and guidance device [FIG. 1, (3)] described here. The present invention also comprises the means for equipment of a person [FIG. 5] or of an animal subjected to the analysis of their movements by the device which is the subject of the invention. An autonomous or automatic apparatus means that it is not occupied by a human driver, and that its guidance means is automatic. Additionally, the system described here can be used as a complement to human driving, for assistance or safety purposes [FIG. 4]. This is the case, for example, when this system is used as an anti-collision system on an occupied vehicle. According to the applications, such an apparatus can be a drone, a robot, a machine, or any other mechanical apparatus intended to move. The present invention can also be used to mark or tag static or moving objects which can be of public interest e.g. artwork or in environments where object identification is of interest to optimize certain actions or work-flows like e.g. tagging objects in warehouses. The person or machine with interest in those objects needs to be equipped with a three-dimensional camera [FIG. 1, (2)] connected to a means of computing similar to [FIG. 1, (2d)] which can be comprised in e.g. a smartphone or any other kind of hand-held device or being comprised in the machine or robot itself. The beacon [FIG. 1, (1)] identifies itself with a code unique in the environment of interest or even world-wide. This enables the person or machine with interest in the object to identify this object and to receive meta information about the object. To do so, the three-dimensional camera [FIG. 1, (2)] can, but must not be connected to a database linking to and containing the meta-information. If not connected to a database, the information about the object can fully be stored on and transmitted by the beacon [FIG. 1, (1)]. This information can be updated in real-time, e.g. using sensor readings of sensors connected to the beacon [FIG. 2, (1f)].

The invention claimed is:

1. A dynamic tracking system comprising:
   a three-dimensional camera based on time-of-flight technology, the three-dimensional camera including,
      a receiver sensitive to light emissions in a certain wavelength range,
      a first emitter of light signals, and
      a computer configured to compute three-dimensional information from the receiver and to control the first emitter, and
   a beacon sensitive to the light signals from the first emitter, the beacon including a second emitter of light signals of a wavelength compatible with a sensitivity of the three-dimensional camera, the beacon configured to send return light signals by the second emitter with a variable delay after receiving the light signals from the first emitter, the beacon associated to a unique identification,
   wherein after receiving a first light signal from the first emitter, the beacon sends a first return light signal to the receiver having a first time delay, and after receiving the first return signal at the receiver, the receiver measures the first time delay, and after receiving a second light signal from the first emitter, the beacon sends a second return light signal to the receiver having a second time delay, and after receiving the second return signal at the receiver, the receiver measures the second time delay, and
   wherein the computer is configured to determine the unique identification of the beacon in a field of view of the three-dimensional camera based on the measured first delay and the second delay.

2. The tracking system according to claim 1, wherein the light signals of the first and the second emitter are emitted in the near infrared.

3. The tracking system according to claim 1, wherein the light signal from the first emitter is a characteristic pulsed sequence.

4. The tracking system according to claim 1, wherein the beacon further comprises:
an analysis device of the signal emitted from the first emitter and a database permitting storage of characteristics of the signal emitted by the first emitter.

5. The tracking system according to claim 1, wherein after receiving the first light signal from the first emitter, the beacon is configured to send the first return light signal by the second light emitter with the first time delay as compared to an arrival time of the first light signal at the beacon, after receiving the second light signal from the first emitter, the beacon is configured to send the second return light signal by the second light emitter with the second time delay as compared to an arrival time of the second light signal at the beacon, such that different sent return light signals have different delays relative to the respective received light signal.

6. The tracking system according to claim 1, wherein the return light signals sent by the beacon includes a pre-established sequence of several successive delays, changing at each new start of a frame acquisition of the receiver of the three-dimensional camera.

7. The tracking system according to claim 1, wherein the return light signals sent by the second light emitter of the beacon includes a change of wavelength with respect to the received light signals.

8. The tracking system according to claim 1, wherein the three-dimensional camera is configured to connect to a database or memory, for accessing data for recognizing the first time delay of the first return light signal and the second time delay of the second return light signal sent by the second light emitter of the beacon.

9. The tracking system according to claim 1, in which the three-dimensional camera further comprises:
a communication interface configured to send an instruction to the beacon.

10. The tracking system according to claim 1, further comprising:
another computer for data analysis, controls, and external interfacing to vehicle data communication services, local data communication services, and/or global data communication services.

11. An automatic guidance method of an apparatus in motion comprising the steps of:
emitting a first signal towards a beacon that is arranged at the apparatus in motion by a three-dimensional camera based on time-of-flight technology, the beacon associated with a unique identification;
receiving the first signal at the beacon and reemitting a first return signal towards the three-dimensional camera by the beacon, the reemitted first return signal having a first predetermined delay relative to an arrival time of the received first signal at the beacon;
receiving the first return signal by the three-dimensional camera;
emitting a second signal towards the beacon by the three-dimensional camera;
receiving the second signal at the beacon and reemitting a second return signal towards the three-dimensional camera by the beacon, the reemitted second return signal having a second predetermined delay relative to an arrival time of the received second signal at the beacon;
receiving the second return signal by the three-dimensional camera; and
determining the unique identification of the beacon based on the first and second predetermined delay.

12. The guidance method according to claim 11, wherein in the steps of emitting, the signal emitted towards the beacon is a pulsed light sequence.

13. The guidance method according to claim 11, further comprising the step of:
modulating the first signal or the second signal at the beacon,
wherein the modulation of the first or the second signal introduces the first or the second predetermined delay into the first or the second signal, respectively, such that different reemitted return signals have a different delay relative to the respective received signal at the beacon.

14. The guidance method according to claim 11, further comprising the step of:
modulating the first or the second signal at the beacon,
wherein the modulating introduces characteristics of the beacon into the first or the second return signal.

15. The guidance method according to claim 11, further comprising the step of:
modulating the first or the second signal at the beacon,
wherein the step of modulating introduces information to activate or deactivate a function of the apparatus in motion into the first or second return signal.

16. The guidance method according to claim 11, further comprising the step of:
emitting instructions by a guidance and tracking system that includes the three-dimensional camera for the beacon.

17. The guidance method according to claim 11, wherein the apparatus in motion is a drone or a robot.

18. The guidance method according to claim 11, further comprising the step of:
receiving an activation signal at the three-dimensional camera by the first or second return signal.

19. The guidance method according to claim 11, further comprising the step of:
randomly modulating the first or second signal such that the first or second return signal sent by the second light emitter of the beacon is not recognized by a computer of the three-dimensional camera.

20. A dynamic tracking system comprising:
a three-dimensional camera using time-of-flight technology and sensitive to light emissions in a wavelength range;
a first emitter configured to send light signals;
a computer operatively connected to the three-dimensional camera and the first emitter, the computer configured to control the first emitter to send the light signals; and
a beacon sensitive to the light signals from the first emitter, the beacon associated with a unique identification and including a second emitter of light signals of the wavelength range of the three-dimensional camera, the beacon configured to send return light signals by the second emitter, the return light signals being sent with different delays relative to an arrival time at the beacon of a respective light signal from the first emitter,
wherein the three-dimensional camera is configured to receive the return light signals and is configured to measure the different delays from the return light signals, and
wherein the computer is configured to determine the unique identification of the beacon based on the measured different delays from the three-dimensional camera.

21. The tracking system according to claim 20, wherein the different delays of the return light signals includes a pre-established sequence of several successive delays that are correlated to the unique identification, the delays being different for each frame acquisition by the three-dimensional camera.

* * * * *